United States Patent [19]
Armstrong et al.

[11] Patent Number: 5,311,585
[45] Date of Patent: May 10, 1994

[54] CARRIER PROPORTIONED ROUTING

[75] Inventors: Robert A. Armstrong, Princeton; Gail L. McDonald, Middletown, both of N.J.

[73] Assignee: AT&T Bell Laboratories, Murray Hill, N.J.

[21] Appl. No.: 868,632

[22] Filed: Apr. 14, 1992

[51] Int. Cl.⁵ .................... H04M 7/00; H04M 15/00
[52] U.S. Cl. .................................. 379/221; 379/220; 379/134; 379/113
[58] Field of Search ............... 379/220, 221, 113, 134, 379/207

[56] References Cited

U.S. PATENT DOCUMENTS

| | | | |
|---|---|---|---|
| 4,756,019 | 7/1988 | Szybicki | 379/112 |
| 4,866,763 | 9/1989 | Cooper et al. | 379/221 |
| 4,991,204 | 2/1991 | Yamamoto et al. | 379/221 |
| 5,086,460 | 2/1992 | Ash et al. | 379/221 |

Primary Examiner—James L. Dwyer
Assistant Examiner—Daniel S. Hunter
Attorney, Agent, or Firm—Eugene J. Rosenthal; Ronald D. Slusky

[57] ABSTRACT

The problem of being unable to supply prescribed fair amounts of telephone traffic to each carrier in a foreign country is overcome by a) assigning a call to one of the carriers in a foreign country at the switch where the call originated b) including an indication of the identity of the assigned carrier with the call as the call is routed from the originating switch to an egress switch and c) retaining at the originating switch an indication of the carrier to which the call is currently assigned. The indication of the assigned carrier stays with the call until either the call is completed to the assigned carrier or it is determined that the call cannot be completed to the assigned carrier. This allows the originating switch to retain control over the assignment of a call to a carrier. Furthermore, the originating switch can cause all the routes from the originating switch to the originally assigned carrier to be tried before it allows another carrier to complete the call. Doing so results in a higher rate of completion of calls to their initially assigned carriers. Each carrier in a country is selected to be the initially assigned carrier for a predetermined percentage of the calls to that country, so as to return to each carrier its fair amount of traffic. The percentages according to which the carriers are chosen may be iteratively updated so as to secure close conformity with the predetermined fair amounts.

32 Claims, 5 Drawing Sheets

CARRIER PROPORTIONED ROUTING

TECHNICAL FIELD

This invention relates to the routing of telephone calls, and more particularly, to the routing of telephone calls to countries that have more than one telephone carrier providing telephone service.

BACKGROUND OF THE INVENTION

Currently, several countries are served by more than one international telephone common carrier—each referred to hereinafter as a carrier—and the number of countries so served is expected to grow in the future. Each carrier that supplies telephone traffic to a foreign country having multiple carriers desires that the carriers in that foreign country return to it a "fair" amount of telephone traffic. Such fair amounts are typically contracted for by representatives of the carriers and, most often, are related to the percentage of total intercountry telephone traffic each carrier supplies to the other.

Prior art systems for insuring the return of fair amounts of telephone traffic require the use of special trunking, routing and screening arrangements. One such prior art system forces telephone traffic to be delivered to a switch from which telephone traffic exits a carrier's network to enter the network of another carrier. Such a switch is called an egress switch. It is solely the responsibility of the egress switches to route telephone traffic to each carrier in a foreign country, as prescribed by the fair amounts agreed upon. However, this prior art system can not guarantee the return of the prescribed fair amounts of telephone traffic. As such, each carrier must account to its contracting partners for any discrepancies that result between the contracted for fair amounts and the actual traffic delivered.

The introduction of the ability to perform multiple homing routing, such as Split Access Flexible Egress Routing (SAFER), which is well known to those skilled in the art, has not corrected this problem. This is because telephone calls are still only assigned to a particular carrier at an egress switch. Moreover, each call loses the identity of its assigned carrier should it be necessary to return, or "crank", the call back to the switch at which the call originated (originating switch) for alternative routing instructions. (An egress switch cranks calls destined for foreign countries back to the originating switch in the event the egress switch cannot complete the call because, for example, no trunks to the assigned carrier are available.) As a result, when the originating switch routes a call that was cranked back to another egress switch, there is no guarantee that the new egress switch will assign the call to the same carrier to which the original egress switch had assigned the call. Therefore, it is not possible to accurately control the amount of telephone traffic delivered to each carrier, and hence, to return to each carrier its contracted for fair amount.

This inability to guarantee the return of prescribed fair amounts of telephone traffic also exists in prior art systems of the type using dedicated trunks to pass a call from an egress switch unable to complete a call to the carrier it chose to another egress switch serving the same carrier. This is because the call can only be forwarded to one additional egress switch and it is not guaranteed that this additional egress switch can complete the call to the originally selected carrier. If the call is not completed by the additional egress switch, the call is lost.

Another prior art system, carrier specific routing, which is not employed for purposes of returning a fair amount of traffic, assigns a carrier to a call at an adjunct processor associated with the originating switch based on the telephone number of the party paying for the call. The originating switch sends an indication of the assigned carrier with the call information if it routes the call to an egress switch. However, in such a case, no indication of the assigned carrier is retained in the originating switch. As a result, once a call is assigned a carrier in carrier specific routing, there is no possibility of changing the assignment. Furthermore, if the call is not completed to the assigned carrier by the egress switch or a single additional egress switch connected to the egress switch by dedicated trunks, as described above, the call is lost.

SUMMARY OF THE INVENTION

The above mentioned problem of being unable to supply prescribed fair amounts of telephone traffic to each carrier in a foreign country is overcome, in accordance with the principles of the invention, by a) assigning a call to one of the carriers in a foreign country at the switch where the call originated, b) including an indication of the identity of the assigned carrier with the call as the call is routed from the originating switch to an egress switch and c) retaining at the originating switch an indication of the carrier to which the call is currently assigned. Advantageously, the indication of the assigned carrier stays with the call both at the originating switch and wherever the call is routed to until either the call is completed to the assigned carrier or it is determined that the call cannot be completed to the assigned carrier. This allows the originating switch to retain control over the assignment of a call to a carrier. Furthermore, the originating switch can cause all the routes from the originating switch to the initially assigned carrier to be tried before it allows another carrier to complete the call. Doing so results in a higher rate of completion of calls to their initially assigned carriers. Each carrier in a country is selected to be the initially assigned carrier for a predetermined percentage of the calls to that country, so as to return to each carrier its fair amount of traffic.

In one embodiment, the originating switch initially assigns a carrier to each call to a foreign country based upon predetermined percentages stored in its "carrier table". An indication of which carrier is currently assigned to each call is stored at the originating switch. The originating switch sequentially selects routes for the call from a routing table associated with the assigned carrier and attempts to route the call over each of the selected routes to an egress switch that can complete the call to the assigned carrier until either a) the call is successfully routed to the assigned carrier or b) no further routes to that carrier are available. Each time a new egress switch is tried, the originating switch sends the indication of the currently assigned carrier to that egress switch in the Foreign Administration Identifier (FAI) field of the Transit Network Selection parameter of the well-known CCS7 ISUP (ISDN User Part) IAM (Initial Address Message) message.

In the event that the call cannot be completed to the initially assigned carrier, one or more overflow carriers may be tried. The originating switch attempts to complete the call to overflow carriers, as they are assigned to the call, by the same process employed to complete the call to the initially assigned carrier. Tallies are kept that track the number of calls completed to each carrier and the number of calls that are overflowed to other carriers. In accordance with a feature of the invention, the percentages stored in the carrier table may be adjusted so as to secure close conformity with the predetermined fair amounts.

DETAILED DESCRIPTION

Figure 1:
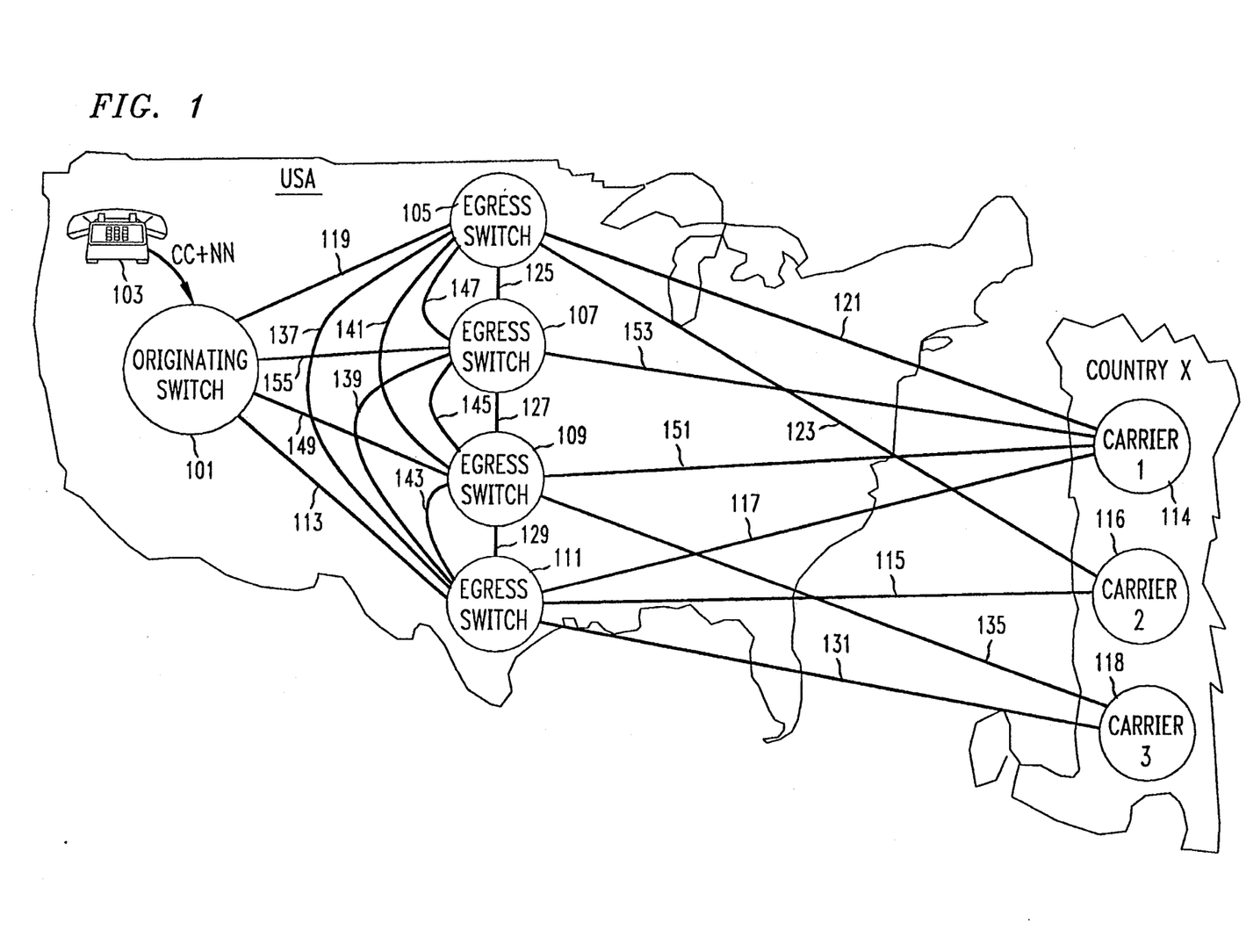
FIG. 1 shows a simplified network for completing calls placed from a first country to locations in a second country that has three international telephone common carriers.

FIG. 1 shows a simplified network for completing calls placed from locations in a first country, illustratively the United States, to locations in a second country that has at least two international telephone common carriers—herinafter referred to as carriers. The second country is country X and it has three carriers. The network in the United States is owned by a single carrier—illustratively AT&T—and it includes a) originating switch 101, b) egress switches 105, 107, 109 and 111 and c) trunk groups 113, 119, 125, 127, 129, 137, 139, 141, 143, 145, 147, 155 and 149. Originating switch 101 and egress switches 105, 107, 109 and 111 are telecommunications switches, such as AT&T's No. 4 ESS TM switch. Trunk groups 119, 149, 155, and 113 connect originating switch 101 to egress switches 105, 107, 109 and 111, respectively. Trunk groups 125, 127, 129, 137, 139, 141, 143, 145 and 147 interconnect egress switches 105, 107, 109 and 111 with each other. It is noted that, for clarity, trunk groups 113, 119, 125, 127, 129, 137, 139, 141, 143, 145, 147, 155 and 149 are depicted as direct connections. However, those skilled in the art will recognize that such trunks may actually be made up of a combination of trunks and switches.

The telephone networks of the three carriers of country X, carrier 1, carrier 2, and carrier 3, are represented in FIG. 1 by the circles having reference numeral designations 114, 116 and 118, respectively. Trunk groups 115, 117, 121, 123, 131, 135, 151, 153 connect egress switches 105, 107, 109, and 111 to carriers 1, 2, and 3. These trunk groups may be only partly owned by AT&T.

We first consider how carrier proportioned routing was implemented in the prior art.

A call from telephone 103 to a location in country X arrives at originating switch 101, which is the switch at which the call originates in the AT&T network. As is well known by those skilled in the art, such an international call typically passes through the network of a local exchange carrier before arriving at the AT&T network. For clarity, such a local exchange carrier network is not shown. Originating switch 101 knows the call is destined for country X because it receives the country code (CC) and national number (NN) to which the caller placed the call.

In the prior art, originating switch 101 is unaware of the number of carriers serving country X. The only thing it is aware of is which ones of egress switches 105, 107, 109 and 111 serve country X. This knowledge is embodied in a routing table for calls to country X which originating switch 101 maintains, such as the routing table shown in Table 1. Responsive to the receipt of a call destined for country X, originating switch 101 can simply consult this table in order to identify an egress switch to which it can route the call. The routing of a call from a first switch to a second, identified, switch is well known in the art.

TABLE 1

| Routing Table (Country X) | |
|---|---|
| Switch | Initial Try Probability |
| EGRESS SWITCH 105 | 20% |
| EGRESS SWITCH 107 | 40% |
| EGRESS SWITCH 109 | 25% |
| EGRESS SWITCH 111 | 15% |

In Table 1, the initial try probabilities represent the relative frequency with which each egress switch should be selected the first time an egress switch is selected for a call to country X. Routing tables of this type were originally developed by network planners, according to well established traffic engineering principles, in an attempt to efficiently use the available international trunks. The probabilities originally employed were based upon the total available capacity to a country at each egress switch. With the introduction of multiple carriers in foreign countries, the function of the routing tables, and accordingly, the initial try probabilities stored therein, were adapted to attempt to achieve a predetermined traffic distribution among the carriers in each country. (The initial try probabilities were developed using the fact that the probability of a call completing to a particular carrier in a country is determined by multiplying a) the probability that the call will be sent to an egress switch that has direct trunks to that particular carrier by b) the probability that the egress switch, once it receives a call, will route it to the country in question via the particular carrier, assuming no blocking of the call.)

For its initial try to complete the call, originating switch 101 employs a stochastic process to select one of egress switches 105, 107, 109, or 111. The stochastic process is such that, over time, the relative frequency of selection of each egress switch equals its initial try probability.

The egress switch, in turn, assigns the call to a particular carrier in country X by selecting a trunk group that corresponds to that carrier. To this end, each egress switch contains a proportional routing table for each destination country, such as the one shown in Table 2. Each probability entered in the proportional routing table indicates the relative frequency with which calls routed to the egress switch should be routed to the country in question over each particular trunk group.

TABLE 2

| Proportional Routing Table (Country X) | |
|---|---|
| Trunk Group | Probability |
| Trunk Group 117 (Carrier 1) | 30% |
| Trunk Group 115 | 30% |

TABLE 2-continued

| Proportional Routing Table (Country X) | |
|---|---|
| Trunk Group | Probability |
| (Carrier 2) | |
| Trunk Group 131 | 40% |
| (Carrier 3) | |

Assume, now, by way of example, that originating switch 101 has routed a call destined for country X to egress switch 111. Assume, further, that the proportional routing table for country X within switch 111 is Table 2 and that egress switch 111 selects trunk group 131, thereby assigning the call to carrier 3. Egress switch 111 must, therefore, attempt to route the call to carrier 3 over a trunk of trunk group 131. Further assume, however, that all the trunks of trunk group 131 are unavailable. In this case, the call cannot be completed to carrier 3 and, in accordance with the prior art, egress switch 111 cranks the call back to originating switch 101 without any indication that it had selected carrier 3 to receive this call.

In response to the crank back, originating switch 101 selects, from Table 1, another egress switch to country X that was previously untried for this call. Unlike the case of initial tries, where the initial try probabilities drive the selection process, the egress switches are, in this case, selected sequentially, starting at the top of the table and selecting the first, previously untried egress switch. Assume that the route selected is to egress switch 105 and that the call is successfully completed thereto. Egress switch 105 also contains a proportional routing table, illustratively, the one shown in Table 3. Since egress switch 105 does not have any trunks connected directly to carrier 3, its proportional routing table does not apportion any traffic to carrier 3. As a result, egress switch 105 has no choice but to attempt to route the call to either carrier 1 or carrier 2, not withstanding the fact that egress switch 111 had chosen carrier 3 and not withstanding the fact that an available route exists from originating switch 101 to carrier 3 by way of egress switch 109. It can be shown that the overall consequence of this prior art approach is that the desired fair distribution of traffic to the various carriers—which is reflected in the initial try probabilities stored in the originating switch routing tables—is not achieved as accurately as desired.

TABLE 3

| Proportional Routing Table | |
|---|---|
| Trunk Group | Probability |
| Trunk Group 121 (Carrier 1) | 60% |
| Trunk Group 123 (Carrier 2) | 40% |

Consider now, by contrast, the carrier proportional routing of the present invention. In particular, FIGS. 2 and 3, in combination, show a flow chart of a process, embodying the principles of the invention, for use in routing calls to countries served by multiple carriers from an originating switch. Also shown, in FIG. 4, is a flow chart of a process, embodying the principles of the invention, for use in routing calls at egress switches.

Figure 2:
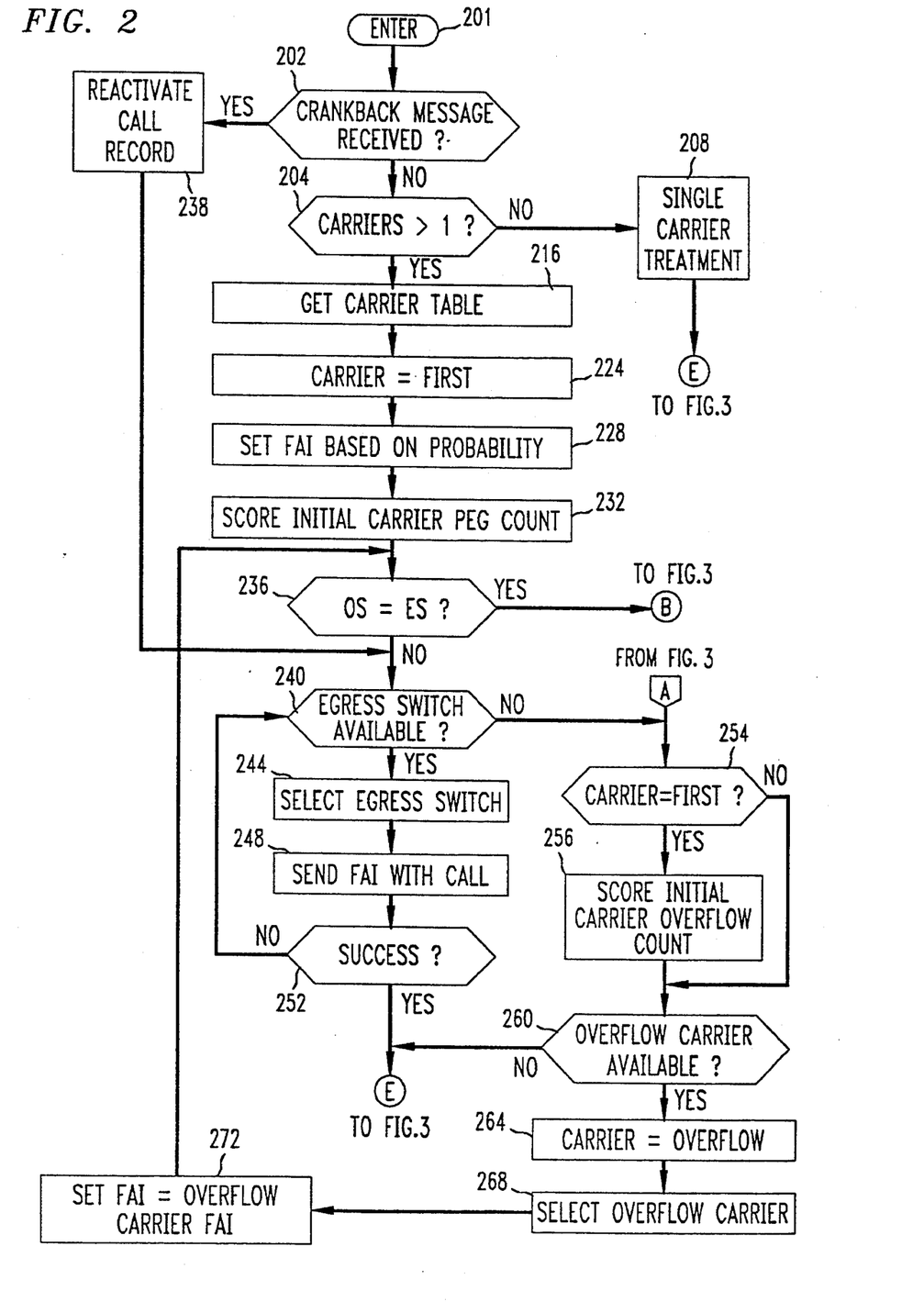
FIGS. 2 and 3, in combination, show a flow chart of a process, embodying the principles of the invention, for use in an originating switch that routes calls to countries served by multiple carriers.
Figure 3:
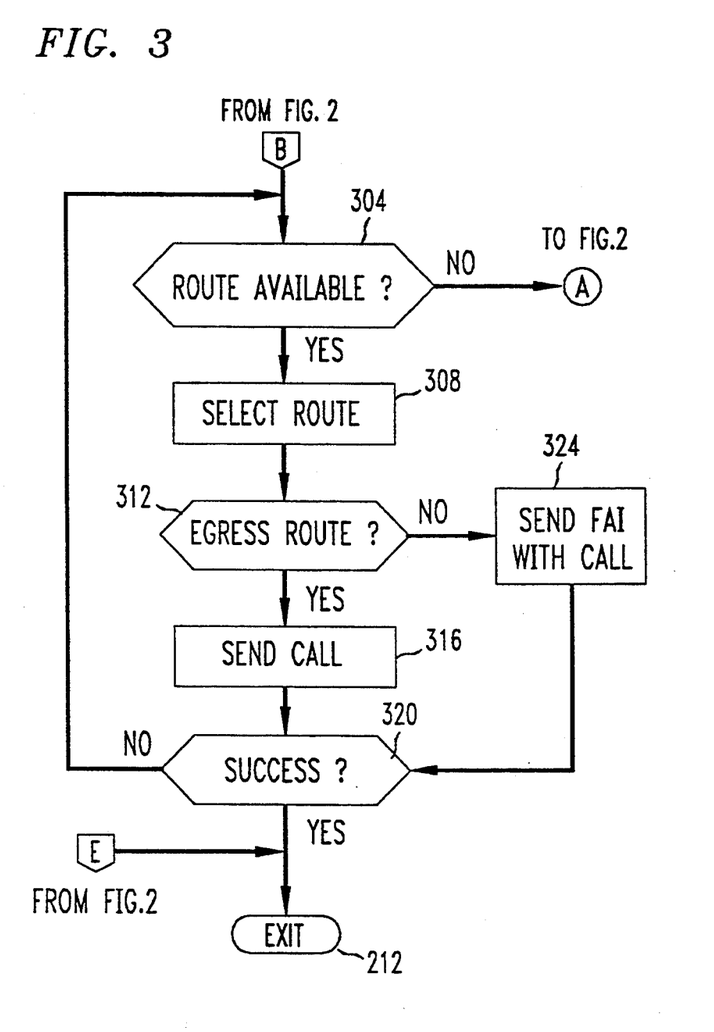
Figure 4:
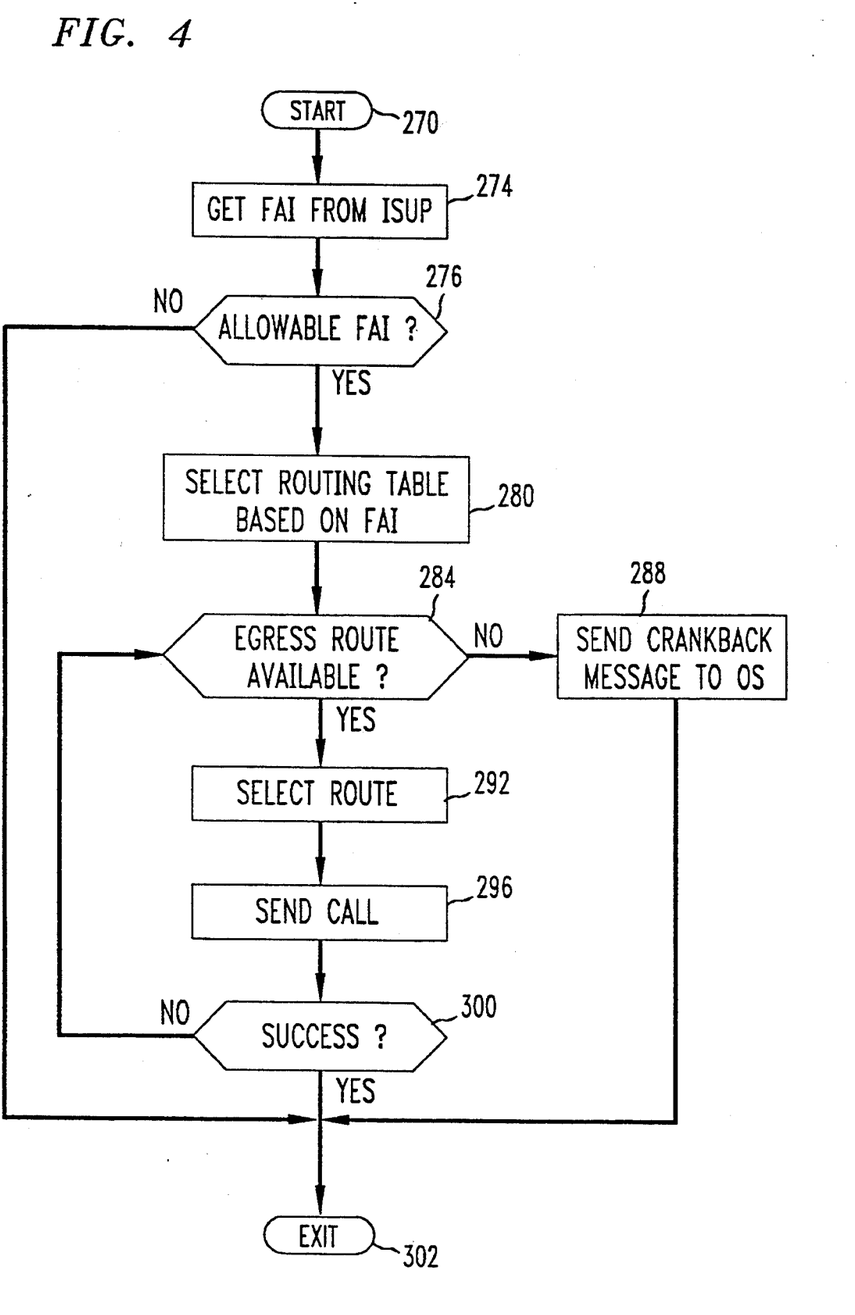
FIG. 4 shows a flow chart of a process embodying the principles of the invention, for use in an egress switch that routes calls to countries served by multiple carriers.

The process shown in FIGS. 2 and 3 is entered, at step 201, when a call originates in the AT&T network at one of the five switches shown in FIG. 1. It is initially assumed, as before, that the caller makes the call from telephone 103. Therefore, originating switch 101 receives, as part of the initialization in step 201, the country code and the national number to which the caller placed the call.

Next, conditional branch point 202 tests to determine if the process was entered in response to the originating switch receiving a crank back message. If the test result in step 202 is YES, this cannot be the initial entry into the process for this call. Therefore, control passes to step 238, described further below. If the test result in step 202 is NO, control passes to conditional branch point 204.

At this point in the process, conditional branch point 204 tests to determine if there is more than one carrier in the country designated by the country code. This may be done by checking the value for the designated country in an array of values indexed by country code. A first predetermined value indicates a country is served only by one carrier, while a second predetermined value indicates more than one carrier. If the test result in step 204 is NO, control passes to step 208, which routes the call by giving it the conventional treatment for a call to a country having only a single carrier. The process is then exited in step 212.

Each originating switch stores a carrier table associated with each destination country. Such a table has a line for each carrier serving that country. An exemplary such table is shown in Table 4. If the test result in step 204 is YES, there is more than one carrier in the destination country. Therefore, control passes to step 216, in which originating switch 101 gets the carrier table for the destination country.

A foreign administration identifier (FAI) register is associated with each call and its value identifies the carrier currently assigned for the call. The value of the FAI register is initialized to zero upon origination of a call and an FAI value of zero indicates that a carrier has not yet been assigned for a call. Eventually, a value of the FAI register may be sent to an egress switch. One way of doing so is to use the value of the FAI register as the value of the FAI field of the Transit Network Selection (TNS) parameter in a well known CCS7 ISUP IAM message. The FAI column within the carrier table (Table 4) contains the FAI values that represent each carrier. Thus, for country X, carrier 1 has an FAI value of 1, carrier 2 has an FAI value of 2 and carrier 3 has an FAI value of 3.

The entry in the routing table column of Table 4 is a pointer to a routing table associated with the carrier whose FAI value is listed on the same line. The initial try probabilities represents the relative frequency with which each carrier should be selected the first time a carrier is selected for a call at an originating switch. The OVF field contains a list of overflow carriers which are to be used if a carrier that is initially selected cannot complete the call. The listing is ordered from left to right. The OPC and OVPC columns contain peg counts for the carrier with which they are associated. The peg counts, and how they are developed, are described further below.

TABLE 4

| Carrier Table (Country = Country X) | | | | | |
|---|---|---|---|---|---|
| Carrier | Routing | Initial Try | | Traffic Count | |
| FAI | Table | Probability | OVF | OPC | OVPC |
| 1 | RT1 | 85.0% | 2 | 83 | 0 |
| 2 | RT2 | 10.0% | 1, 3 | 11 | 2 |

TABLE 4-continued

| Carrier Table (Country = Country X) | | | | | |
|---|---|---|---|---|---|
| Carrier FAI | Routing Table | Initial Try Probability | OVF | Traffic Count OPC | OVPC |
| 3 | RT3 | 5.0% | 1, 2 | 6 | 3 |

Next, in step 224, a variable CARRIER, is set equal to FIRST. This indicates that the originating switch is attempting to route the call to an initially assigned carrier. In accordance with an aspect of the invention, the originating switch assigns the initial carrier to the call, in step 228. As in the prior art, the initial assignment is based upon a stochastic process that results in the relative frequency of initial assignment to each carrier being equal to that carrier's initial try probability. The value of the FAI register is set equal to the value of the assigned carrier. The value is also stored with the call information, in accordance with an aspect of the invention, for use in the event of a crank back, as described below. Next, in step 232, a so-called "peg count" is scored for the initially assigned carrier. A peg count is scored by incrementing a count associated with each carrier. The peg counts for each carrier thus indicate the number of times, within a predefined period, that the associated carrier was the initially assigned carrier. The originating peg count (OPC) column of Table 4 shows illustrative peg counts for each carrier after 100 calls.

Next, conditional branch point 236 tests to determine if the originating switch (OS) is also an egress switch (ES) for the currently assigned carrier. In other words, conditional branch point 236 tests if the originating switch has trunks that directly reach the currently assigned carrier. For the network shown in FIG. 1, a YES result in step 236 can arise only if the call originated at one of egress switches 105, 107, 109, or 111. The handling of such a YES result, indicating that OS=ES, is described further below.

If the test result in step 236 is NO, control passes to conditional branch point 240, which tests to determine if there remains at least one previously untried egress switch in the routing table for the currently assigned carrier. Table 5 shows a routing table for the carrier having FAI=1 in Table 4, which is pointed to by pointer RT1.

TABLE 5

| Routing for Carrier 1 (Country X) | |
|---|---|
| Switch | Initial Try Probability |
| EGRESS SWITCH 105 | 25% |
| EGRESS SWITCH 107 | 25% |
| EGRESS SWITCH 109 | 25% |
| EGRESS SWITCH 111 | 25% |

If the test result in step 240 is YES, there indeed remains in the routing table of the assigned carrier at least one previously untried egress switch that reaches the assigned carrier. Therefore, control passes to step 244, which selects one of them. Selection of the egress switch is performed as described above in conjunction with the selection process for Table 1. Next, in step 248, an attempt is made to route the call to the selected egress switch. The value of the FAI register is sent with the call information. One way to send the value of the FAI register is to include is as the FAI field of the TNS parameter of an ISUP IAM message.

Thereafter, conditional branch point 252 tests to determine if the call was successfully completed to the egress switch. If the test result in step 252 is YES, originating switch 101 exits the process in step 212. If the test result in step 252 is NO, control passes back to conditional branch point 240 to try another egress switch, if one is available for the assigned carrier.

If the test result in step 240 is NO, this indicates that there remains no untried egress switches that can reach the initially assigned carrier. It has thus been determined, therefore, that the call cannot be completed to the assigned carrier and it is necessary to select an alternate carrier to which the originating switch will attempt to complete the call. Every carrier selected that was not the initially assigned carrier for a call is known as an overflow carrier for that call.

Toward the end of selecting an overflow carrier, control passes to conditional branch point 254, which tests to determine if the variable CARRIER is equal to FIRST. If the test result in step 254 is YES, control passes to step 256, in which the originating switch scores an initial carrier overflow peg count (OVPC). The overflow peg counts for each carrier is stored in the carrier's associated traffic count portion of Table 4. The overflow peg count indicates the number of times, in a predetermined period of time, that a call could not be completed to the initially assigned carrier. Control then passes to conditional branch point 260. If the test result in step 254 is NO, the overflow peg count has already been incremented for this call. Therefore, control passes directly to conditional branch point 260.

Conditional branch point 260 tests to determine if an overflow carrier is available. If the test result in step 260 is NO, the call cannot be completed at all. Therefore, the process exits in step 212. If the test result in step 260 is YES, control passes to step 264, in which the temporary variable CARRIER is set equal to OVERFLOW. This indicates that the originating switch is attempting to route the call to an overflow carrier and that no further traffic counts should be scored for the initially assigned carrier.

In accordance with an aspect of the invention, it is the originating switch that assigns an overflow carrier to the call, as indicated in step 268, rather than the egress switch, as is done in the prior art. The carrier assigned is the one having the next listed, previously untried entry in the predetermined overflow list stored in the OVF field of the carrier table (Table 4) for the initially assigned carrier. In step 272, the value of the FAI register is set equal to the value of the assigned overflow carrier. Thereafter, control passes back to step 236 and the process continues, as described above, for originating switches.

Assume, at this point, that the call has been successfully routed from originating switch 101 to an egress switch, which is capable of directly completing the call to the assigned carrier. Upon receipt of the call at such an egress switch, the egress switch enters the process shown in FIG. 4, at step 270. In step 274, the value of the FAI register for the call is set equal to the FAI value as part of the call information from the originating switch. In one embodiment, this value is contained in the FAI field of the TNS parameter of the ISUP IAM message that was received with the call.

Thereafter, conditional branch point 276 tests to determine if the FAI value is an allowable value. An allowable value is an FAI value that corresponds to a carrier associated with the country code and national number of the call. Thus, for egress switch 105, allowable FAI values are 1, 2, and 3, but not 4. If the test result in step 276 is NO, the process is exited in step 302. If the test result in step 276 is YES, control passes to step 280, in which the egress switch selects a routing table based on the value in the FAI register received from the originating switch, in accordance with an aspect of the invention.

Next, conditional branch point 284 tests to determine if a previously untried route that directly connects the egress switch to the assigned carrier is available. Such a route is an egress route. If the test result in step 284 is YES, control passes to step 292, in which the egress switch selects a particular one of the available egress routes over which to complete the call to the assigned carrier. The routing table for the assigned carrier, stored in the egress switch, contains a list of all the egress routes. Table 6 illustratively shows the routing table for carrier 1, in egress switch 111. When a call has been routed to an egress switch, only the egress routes listed in the routing table of that egress switch may be selected. Such trunk groups are egress routes. The entries in the routing table of an egress switch that indicate other egress switches can be selected only in conjunction with calls that originate at that egress switch, as described further below. The process of selecting the initial and subsequent egress routes (if any) is the same as the one used in selecting an egress switch, as described above for Table 1.

TABLE 6

| Routing for Carrier FAI = 1 (County X) | |
|---|---|
| Switch | Initial Try Probability |
| TRUNK GROUP 117 | 100% |
| EGRESS SWITCH 105 | 0% |
| EGRESS SWITCH 107 | 0% |
| EGRESS SWITCH 109 | 0% |

In step 296, the egress switch sends the call over the selected route to the assigned carrier. Next, conditional branch point 300 tests to determine if the call was successfully completed to the assigned carrier. If the test result in step 300 is YES, the process is exited in step 302. No further handling of this call is necessary by either the originating switch or any egress switch in the AT&T network. If the test result in step 300 is NO, control passes back to step 284 and an attempt is made to find an alternate route from the egress switch to the assigned carrier.

If the test result in step 284 is NO, the egress switch cannot complete the call to the assigned carrier. Therefore, control passes to step 288, in which the egress switch sends a crank back message to originating switch 101. The egress switch knows which switch originated the call from the information it received with the call. Thereafter, the process exits, in the egress switch in step 302.

Originating switch 101, upon receipt of a crank back message from the egress switch, reenters the process at step 201 (FIG. 2). The test result in step 202 is YES, and control passes to step 238, in which originating switch 101 reactivates the record of the call indicated in the crank back message to the same state it had prior to the sending of the call to the egress switch. Thereafter, control passes to step 240 and the process continues as described above. In accordance with an aspect of the invention, an attempt is initially made to complete the call to the assigned carrier but via a different egress switch.

Should a call originate in the AT&T network at a switch which may also be an egress switch for that call, a slightly modified version of the above process is required in order to successfully complete the call. For calls to country X (FIG. 1), such calls could originate at egress switches 105, 107, 109, or 111. Upon origination of a call at such a switch, the process shown in FIGS. 2 and 3 is entered in step 201. The process continues, as described above for originating switch 101, until it reaches conditional branch point 236. A switch at which a call originates is an egress switch for that particular call only when the switch has trunks directly connecting it to the call's currently assigned carrier. Thus, egress switch 105 could never be an egress switch for calls to carrier 3, since it has no trunks to carrier 3. If the originating switch is an egress switch for the currently assigned carrier, the test result in step 236 is YES, and control passes to step 304.

Conditional branch point 304 tests to determine if a previously untried route is available to the assigned carrier. If the test result in step 304 is NO, there are no routes available to the assigned carrier. Therefore, control passes back to step 254 and the process continues, as described above. If the test result in step 304 is YES, control passes to step 308, in which the egress switch selects a route from Table 6. The selection of routes is made by the same process used to select egress switches described for table 1. Unlike the case of an egress switch that did not originate the call, both egress routes and egress switches may be selected. Next, conditional branch point 312 tests to determine if the route selected is an egress route for the currently assigned carrier.

If the test result in step 312 is YES, control passes to step 316 and the call is sent to the assigned carrier, as in step 296 (FIG. 4). Next, conditional branch point 320 tests to determine if the call was successfully completed to the assigned carrier. If the test result in step 320 is YES, the process is exited in step 212. If the test result in step 320 is NO, control passes back to step 304 to try any other routes which may be available to the assigned carrier.

If the test result in step 312 is NO, the route selected is not an egress route for the assigned carrier. Therefore, control passes to step 324 and the switch attempts to route the call to the selected egress switch. In accordance with an aspect of the invention, the current value of the FAIL register is included in the call information that is sent to the egress switch, as in step 248. Control then passes to step 320 and the process continues as described above.

In accordance with a feature of the invention, the percentages stored in the carrier table (Table 4) may be updated so as to secure close conformity with the predetermined fair amounts. After a predetermined period of time has elapsed, the percentage of calls completed to each carrier can be compared with the fair amounts. If the percentage of calls completed to a particular carrier is lower than its fair amount, the percentage entered in Table 4 for that carrier can be increased slightly. This will result in the AT&T network attempting to complete calls placed to country X via the particular carrier more often. Provided that there are no problems in the AT&T network or between the AT&T network and the carrier, such additional attempts will result in additional call completions to the particular carrier. These additional call completions will help the number of calls completed to the particular carrier more closely align with the prescribed fair amounts. Similarly, if the percentage of calls completed to a particular carrier is higher than its fair amount, the percentage entered in Table 4 can be decreased slightly.

Such changes may be made as part of administering the network. Alternatively, they may be made independently by each switch. In either case, the changes may be made iteratively. If changes are made iteratively by each switch independently, they should also be brought to the attention of a network operator, so that it can be determined if any changes to the connections between AT&T and the carriers are necessary to permit closer conformance of call completions to the fair amounts. As an alternative, the percentage of calls initially assigned to each carrier may be employed instead of the percentage of calls completed. Furthermore, those skilled in the art will recognize that the basis for traffic accounting and, therefore, the basis for the setting of the percentages, can be measured in units other than the number of calls. Such units may include the length of connection time or the cost of such connection time. Also, calls completed to a carrier as the selected overflow carrier may be included in the call accounting.

Figure 5:
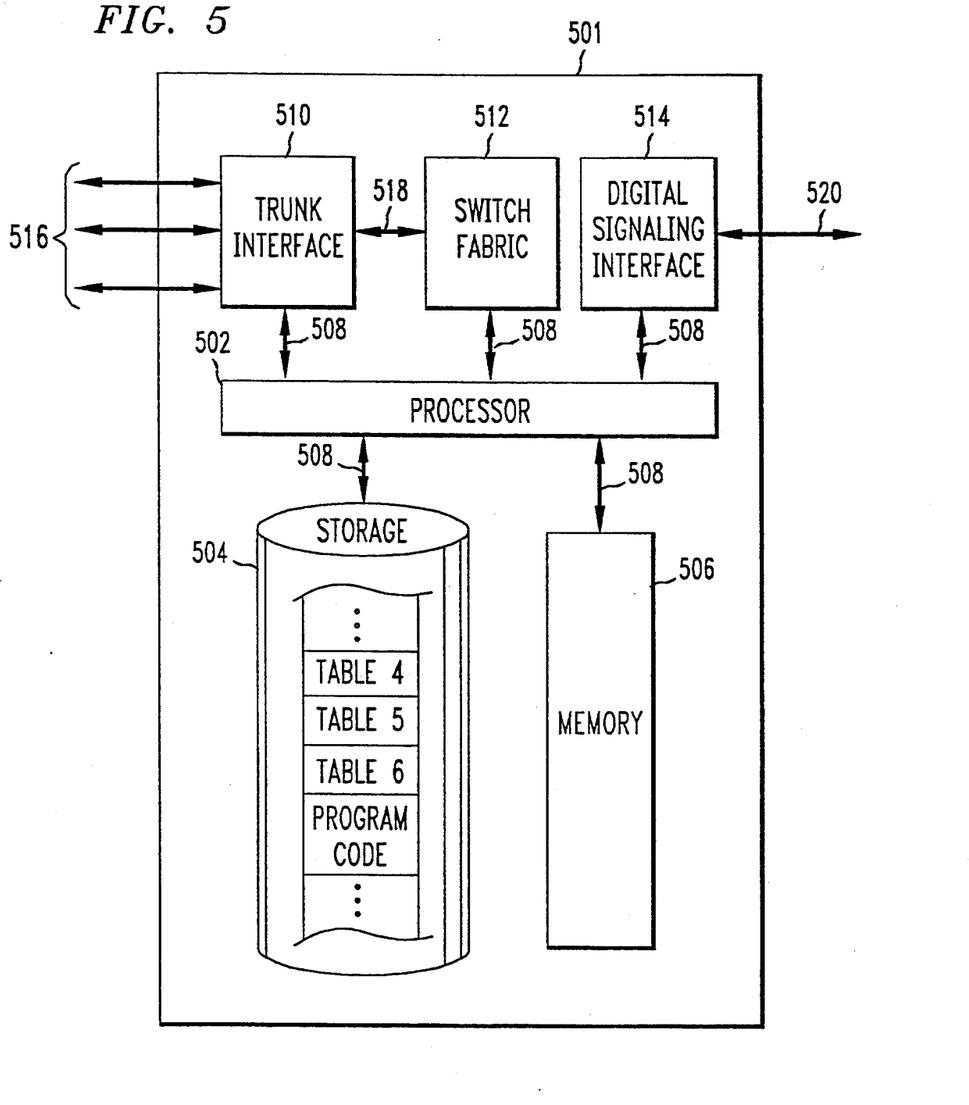
FIG. 5 shows a switch, in simplified block diagram form, for use in the network of FIG. 1.

FIG. 5 shows, in simplified block diagram form, switch 501 for use as an originating or egress switch in the AT&T network, in accordance with an aspect of the invention. Switch 501 is a stored program control switch. Storage 504 and memory 506 interface with processor 502 via bus 508. Storage 504 is for long term storage of data and programs. Shown are the contents of a section of storage 504, including Tables 4, 5 and 6, as well as the program code necessary to execute the processes described above in conjunction with FIGS. 2, 3 and 4. Memory 506 is for short term storage of data and programs.

Switch 501 also includes trunk interface 510, switch fabric 512 and digital signaling interface 514. Trunk interface 510 is connected to a) trunks 516, b) processor 502, by way of bus 508, and c) switch fabric 512, via link 518. Trunk interface 510 terminates each of trunks 516. It can convey in-band signals to and from trunks 516. Processor 502 specifies the in-band signals supplied from trunk interface 510 and it is supplied with the information contained in in-band signals received by trunk interface 510. Switch fabric 512 performs, under the control of processor 502 via bus 508, all the switching necessary to connect trunks 516 to each other. Digital signaling interface 514 is a transceiver for communicating signaling messages in digital form over link 520. Link 520 connects switch 501 to a separate network used for inter-switch communications. Messages destined to and from processor 502 are communicated over bus 508. Either trunk interface 510 or digital signaling interface 514 can be used to send call information, including the FAIL value, to another switch. It is digital signaling interface 514 that would transmit or receive an ISUP message.

It is noted that the process described above, or portions thereof, may be performed in adjunct processors that are associated, either permanently or transitorily, with the switch at which a call originates. For purposes of the invention, such associated adjunct processors are considered to be "at the originating switch". Also included within the scope of the invention, is the use of the above described process at another switch in the network to which calls are forwarded and from which the routing of the call to the foreign country is controlled.

Those skilled in the art will recognize that instead of storing the indication of the assigned carrier at the switch at which the call originated, the egress switch can include an indication of the assigned carrier as part of the information it supplies back to the originating switch in the event of a crank back.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in a first switch of a telephone network in a first country that must route a telephone call to the telephone network of one of a plurality of carriers in a second country, said method comprising the steps of:
   assigning, in said first switch, said call to one of said carriers of said plurality;
   sending an indication of the identity of said assigned carrier with said call as said call is routed from said first switch to a second switch in said telephone network in said first country; and
   storing, in said first switch, an indication that said call was assigned to said carrier.

2. The invention as defined in claim 1 wherein said second switch is one that directly connects to said assigned carrier, and wherein said method comprises the further steps of:
   receiving said call back at said first switch from said second switch;
   identifying said assigned carrier from said stored indication; and routing said call from said first switch to a third switch in said telephone network in said first country that directly connects to said assigned carrier.

3. The invention as defined in claim 2 wherein said third switch is a switch to which no previous attempt has been made to route said call.

4. The invention as defined in claim 1 including the further steps of:
   determining if said call cannot be completed to said assigned carrier; and
   if so, repeating said assigning, sending and storing steps.

5. The invention as defined in claim 1 wherein said carrier assigned in said assigning step is a carrier to which said call was never previously assigned.

6. The invention as defined in claim 1 wherein said carrier is assigned in accordance with a stochastic function which ensures that the probability that any particular carrier of said plurality will be said assigned carrier is equal to a predetermined probability stored for that particular carrier.

7. The invention as defined in claim 6 including the further steps of:
   maintaining tallies of the number of calls completed to each carrier of said plurality when it is the carrier first assigned to a call; and
   adjusting said predetermined probabilities so as to cause the rate of each of said tallies to the total number of calls completed to said second country to be substantially the same as a predetermined fair amount ratio.

8. The invention as defined in claim 7 wherein said adjusting is performed iteratively.

9. The invention as defined in claim 7 wherein said adjusting is performed independent of any adjustments made in any other switch included in said telephone network in said first country.

10. The invention as defined in claim 6 including the further steps of:
maintaining tallies of the number of calls completed to each carrier of said plurality; and
adjusting said predetermined probabilities so as to cause the ratio of each of said tallies to the total number of calls completed to said second country to be substantially the same as a predetermined fair amount ratio.

11. The invention as defined in claim 10 wherein said adjusting is performed iteratively.

12. The invention as defined in claim 10 wherein said adjusting is performed independent of any adjustments made in any other switch included in said telephone network in said first country.

13. Apparatus for use in a telecommunications switch at which a telephone call originates, said originating switch being part of a telephone network in a first country that must route said telephone call to the telephone network of one of a plurality of carriers in a second country, said apparatus comprising:
means for assigning said call, in said originating switch, to one of said carriers of said plurality to which said call has never been previously assigned;
means for launching with said call from said originating switch to another switch of said network in said first country, an indication of the identity of said assigned carrier with said call, said indication remaining with said call as said call is processed in said network in said first country; and
means for storing in said originating switch an indication that said call was assigned to said carrier.

14. The invention as defined in claim 13 further including:
means for restarting each of said assigning, launching and storing means if said call cannot be completed to said assigned carrier.

15. The invention as defined in claim 13 wherein said carrier is assigned in accordance with stochastic function which ensures that the probability that any particular carrier of said plurality will be said assigned carrier is equal to a predetermined probability stored for that particular carrier.

16. The invention as defined in claim 15 further including:
means for maintaining tallies of the number of calls completed to each carrier of said plurality when it is the carrier first assigned to a call; and
means for adjusting said predetermined probabilities so as to cause the ratio of each of said tallies to the total number of calls completed to said second country to be substantially the same as a predetermined fair amount ratio.

17. The invention as defined in claim 16 wherein said adjusting is performed iteratively.

18. The invention as defined in claim 15 further including:
means for maintaining tallies of the number of calls completed to each carrier of said plurality; and
means for adjusting said predetermined percentages so as to cause the ratio of each of said tallies to the total number of calls completed to said second country to be substantially the same as a predetermined fair amount ratio.

19. The invention as defined in claim 18 wherein said adjusting is performed iteratively.

20. The invention as defined in claim 13 wherein said other switch to which said call is destined, after launching, is a switch of said network in said first country that directly connects to said assigned carrier, and said apparatus further includes:
means for receiving said call back at said originating switch;
means for identifying said assigned carrier from said stored indication; and
means for launching from said originating switch said call so that it is destined for a different switch in said telephone network that directly connects to said assigned carrier.

21. The invention as defined in claim 20 wherein said different switch is a switch to which no previous attempt has been made to launch said call.

22. A method for use in a telecommunications switch at which a call originates, said call being destined for a country having more than one carrier, said switch belonging to a network having a plurality of switches each of which can directly complete a call to at least one of said carriers in said country, said method comprising the steps of:
assigning said call, in said originating switch, to a carrier in said country to which said call was never previously assigned;
identifying a switch of said network other than said originating switch to which said call has not been routed and which can directly complete said call to said assigned carrier;
routing said call from said originating switch to said identified switch with associated call information which includes an indication of said assigned carrier;
receiving said call back at said originating switch when said identified switch was unable to complete said call to said assigned carrier; and
repeating said identifying and routing steps.

23. The invention as defined in claim 22 including the further step of repeating said assigning, identifying and routing steps when no further switches can be identified by said identifying step.

24. The invention as defined in claim 22 wherein said indication is routed to said identified switch in the FAI field of the TNS parameter of a CCS7 ISUP IAM message.

25. A method for use in processing a call assigned to a predetermined carrier at an egress switch of a telephone network for said carrier, said call having originated at another switch of said network and being destined for a country having more than one carrier, said method comprising the steps of:
receiving said call, including a predetermined indication specifying said predetermined carrier, from said originating switch;
routing said call to said carrier if a direct route to said carrier is available; and
cranking said call back to said originating switch if said egress switch is unable to complete said call to said assigned carrier.

26. The invention as defined in claim 25 wherein said direct route is a trunk connecting said egress switch to said carrier.

27. A method for use in a switch at which a call originates, said call being destined for a country having more than one carrier, said switch belonging to a network having a plurality of switches that can directly complete a call to at least one of said carriers in said country, said method comprising the steps of:
  assigning said call to one of said carriers;
  routing said call, associated call information, to one of said switches of said plurality that can directly complete said call to said assigned carrier and including in said call information an indication of said assigned carrier; and
  receiving an indication of said assigned carrier back from said switch to which said call was routed in the event said switch was unable to complete said call to said assigned carrier.

28. The invention as defined in claim 27 wherein said call could not be completed to said assigned carrier by said switch and including the step of repeating said steps of routing and receiving.

29. The invention as defined in claim 28 including the step of repeating said assigning and routing steps if it is determined that said call can not be completed to said assigned carrier.

30. A method for use in a switch of a telephone network in a first country that must route a telephone call to the telephone network of one of a plurality of carriers in a second country, said method comprising the steps of:
  assigning said call to one of said carriers of said plurality, said assigning being performed in the switch of said network in said first country at which said call originates;
  routing said call from said originating switch along with an indication of the identity of said carrier to an egress switch of said network in said first country that connects to the network of said assigned carrier and to which said call was not previously routed;
  determining, at said originating switch in response to a cranking back of said call to said switch, which of said carriers was assigned to said call by said switch; and
  repeating said routing step.

31. Apparatus for use in a telecommunications switch at which a telephone call originates, said switch being part of a telephone network in a first country that must route said telephone call to the telephone network of one of a plurality of carriers in a second country, said apparatus comprising:
  means for assigning said call to one of said carriers of said plurality, to which said call has never been previously assigned;
  means for launching from said switch, to a particular switch of said network of said first country that directly connects to said network of said assigned carrier, with said call, an indication of the identity of said assigned carrier, said indication remaining with said call as said call is processed in said network in said first country;
  means for storing an indication that said call was assigned to said carrier;
  means for receiving said call back at said switch of said telephone network in said first country at which said call originated;
  means for identifying said assigned carrier from said stored indication; and
  means for launching said call so that it is destined for another particular switch in said telephone network that directly connects to said assigned carrier.

32. The invention as defined in claim 31 wherein said another particular switch is a switch to which no previous attempt has been made to launch said call.

* * * * *